US007911503B2

(12) United States Patent
Kobayashi

(10) Patent No.: US 7,911,503 B2
(45) Date of Patent: Mar. 22, 2011

(54) INFORMATION PROCESSING APPARATUS AND INFORMATION PROCESSING METHOD

(75) Inventor: Kazuhiko Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 471 days.

(21) Appl. No.: 12/107,267

(22) Filed: Apr. 22, 2008

(65) Prior Publication Data

US 2008/0266416 A1    Oct. 30, 2008

(30) Foreign Application Priority Data

Apr. 25, 2007    (JP) .................. 2007-115988

(51) Int. Cl.
*H04N 5/228* (2006.01)
*H04N 5/225* (2006.01)
*G06K 9/00* (2006.01)
*G06K 9/36* (2006.01)

(52) U.S. Cl. ............ 348/222.1; 348/169; 382/154; 382/103; 382/106; 382/287

(58) Field of Classification Search .......... 382/103–106; 348/141, 169; 600/414–426
See application file for complete search history.

(56) References Cited

U.S. PATENT DOCUMENTS

| 7,583,275 | B2 * | 9/2009 | Neumann et al. ............ 345/633 |
| 7,613,361 | B2 * | 11/2009 | Anabuki et al. ............. 382/287 |
| 7,620,909 | B2 * | 11/2009 | Park et al. ................... 715/790 |
| 2001/0043738 | A1 * | 11/2001 | Sawhney et al. ............ 382/154 |

OTHER PUBLICATIONS

Klein G et al., Robust visual tracking for non-instrumented augmented reality, Oct. 7, 2003, The Second IEEE and AC M International Symposium, XP10662802, pp. 113-122.*
Wuest H et al., Adaptive Line Tracking with Multiple Hypotheses for Augmented Reality, Oct. 5, 2005, IEEE, XP10856761, pp. 62-69.*
Allen P K et al., Localizaiton Methods for a Mobile Robot in Urban Envrionments, Oct. 1, 2004, IEEE, Voumne 20 No. 5, pp. 851-864.*
Tom Drummond and Roberto Cipolla, "Real-time visual tracking of complex structures", IEEE Transaction of Pattern Analysis and Machine Intelligence, vol. 24, No. 7, pp. 932-946, 2002.
L. Vacchetti, V. Lapetit, and P. Fua, "Combining edge and texture information for real-time accurate 3D camera tracking", Proceedings of International Symposium on Mixed and Augmented Reality, pp. 48-57, 2004.

* cited by examiner

*Primary Examiner* — Jason Chan
*Assistant Examiner* — Pritham Prabhakher
(74) *Attorney, Agent, or Firm* — Cowan, Liebowitz & Latman, P.C.

(57) ABSTRACT

A measurement line segment projection unit (400) projects, onto a sensed image, a three-dimensional model which is arranged at the position and orientation of a physical object (199). A search range is set for each side of the virtual object projected onto the sensed image, near the side of the virtual object in the sensed image based on a positional relationship between the side and other sides of the virtual object. A side of the physical object (199) on the sensed image is searched for within the search range for each side of the virtual object. The position and orientation relationship between the physical object (199) and an image sensing device (50) is calculated using the correspondence relationship, determined based on the search result, between each side of the three-dimensional model projected onto the sensed image and each side of the physical object (199) located on the sensed image.

6 Claims, 9 Drawing Sheets

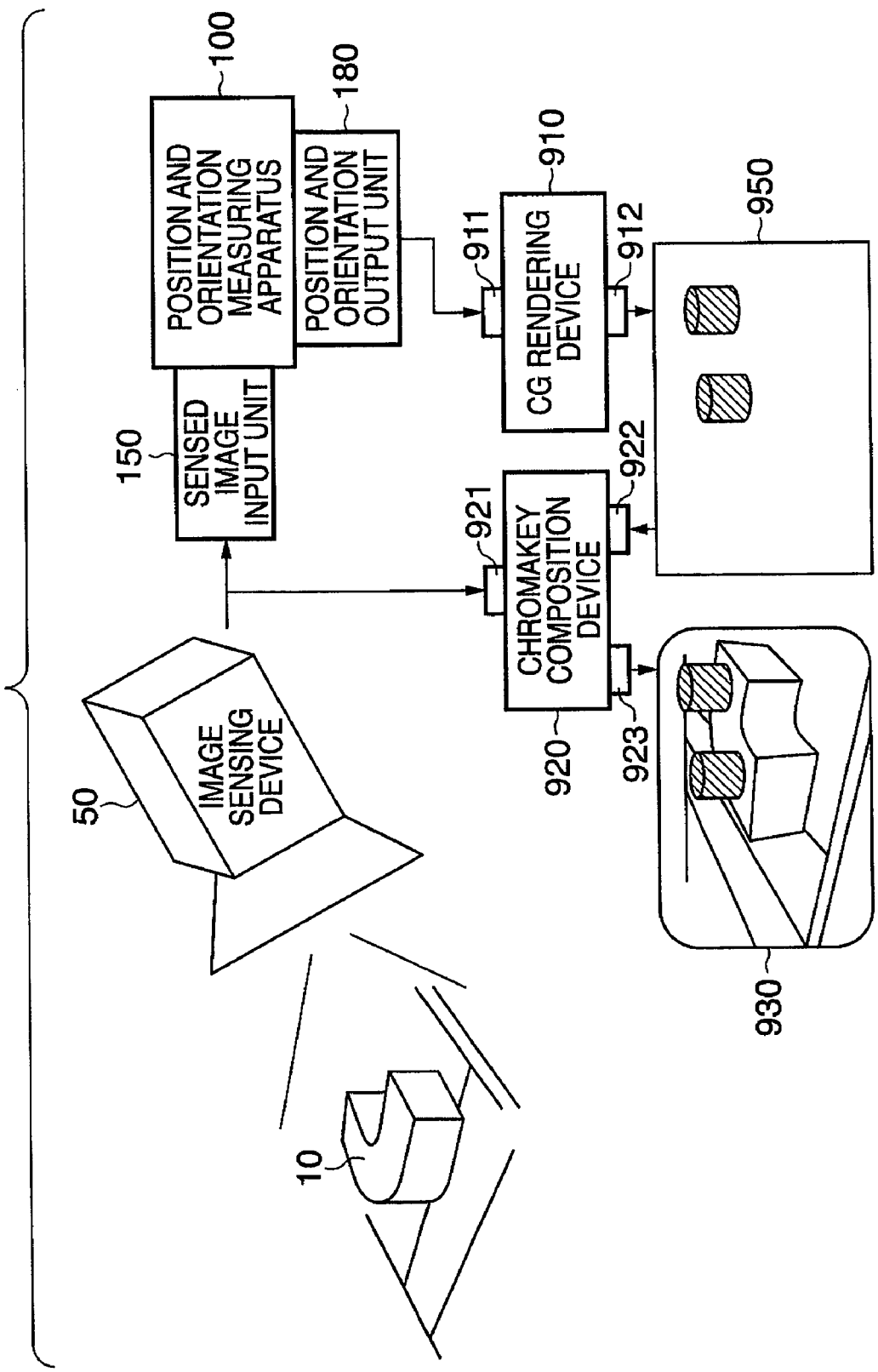

F I G. 10A
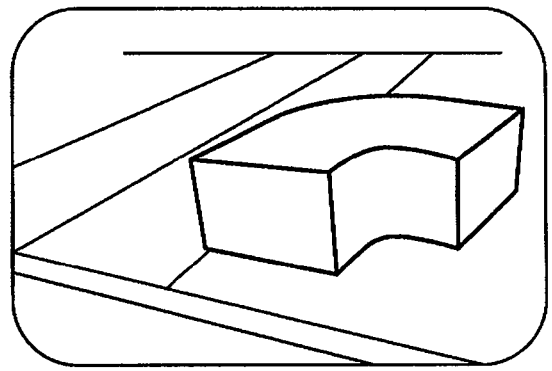
F I G. 10B
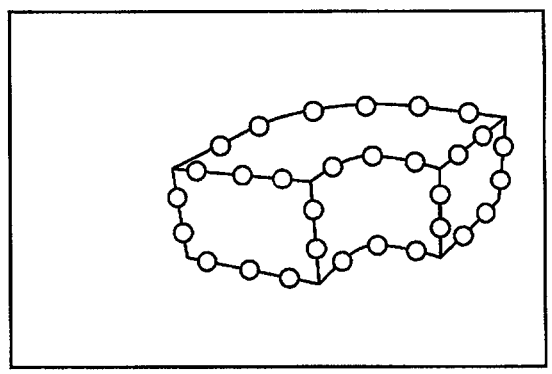
F I G. 10C
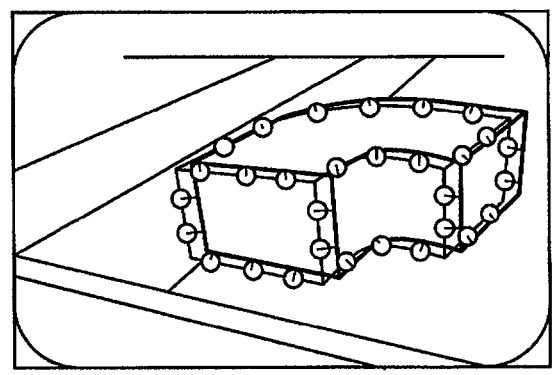

INFORMATION PROCESSING APPARATUS AND INFORMATION PROCESSING METHOD

BACKGROUND OF THE INVENTION

1. Field of the Invention

The present invention relates to a technique of measuring the position and orientation of an image sensing device.

2. Description of the Related Art

In a mixed reality system which presents an image formed by synthesizing, for example, a physical space with a virtual space to a user, it is necessary to measure the position and orientation of an image sensing device for sensing the physical space.

As a method of measuring the position and orientation of an image sensing device, conventionally, a method using an index whose three-dimensional position is known has been disclosed. In this method, the position and orientation of an image sensing device are estimated by optimizing an objective function which uses the distance between a projection position where the three-dimensional position of an index is projected onto a sensed image using the coarse position and orientation of the image sensing device and the position of the index detected on the sensed image.

Additionally, a method using, as a known index, the boundary between object planes included in a physical space has been disclosed. The boundary between observable object planes will be referred to as an "edge" hereinafter.

Non-patent reference 1 discloses the following method. A measurement line segment of a measurement target object is projected onto a sensed image using the coarse position and orientation of an image sensing device. The position and orientation are estimated using, as an objective function, the distance between the projected line segment and an edge detected from the sensed image in correspondence with the measurement line segment.

An outline of this method will be described below.

Using an estimated coarse position and orientation of an image sensing device, a measurement line segment of a measurement target object is projected onto an image sensed by the image sensing device.

Pixels around the measurement line segment projected onto the sensed image are searched to calculate a position of an area (edge area) where the density locally changes.

Optimization calculation is performed such that the distance between the position of the edge area and the projected measurement line segment becomes small.

The estimated coarse position and orientation of the image sensing device are updated in accordance with the optimization calculation.

The position and orientation estimation using a measurement line segment of a measurement target object can be executed when the shape of the measurement target object is known, and the three-dimensional model of the measurement target object can be obtained. Hence, the application range of this method is wide.

Additionally, edge search on the sensed image is done for only the peripheral image of the projected measurement line segment. This shortens the process time as compared to a method of obtaining the distance to a model after an edge is detected from a whole sensed image by image processing. For this reason, this position and orientation estimation method is used for registration of an image sensing device which requires real-time processing for, for example, a mixed reality.

In non-patent reference 1, a measurement target object having a relatively simple shape and coarse measurement line segments whose search areas do not overlap are used.

Since an actual environment includes illumination and objects other than the measurement target object, many edges other than those of the measurement target object are also observed.

If the correspondence between measurement line segments and edges is insufficient, the difference between a measurement line segment and the edge of another measurement line segment may be calculated, and the solution may converge to an erroneous value. Non-patent reference 2 discloses a method of minimizing an objective function while holding a plurality of correspondences on the assumption that a plurality of edges are observed.

One of a plurality of observed edges is associated with a measurement line segment projected onto a sensed image, and optimization calculation is performed such that the distance between them becomes small. Assumption about the association is repeatedly made several times, and the solution is allowed to converge by minimizing the error. This allows robust position and orientation estimation even in an environment including edges other than those of the measurement target.

[Non-Patent Reference 1] Tom Drummond and Roberto Cipolla, "Real-time visual tracking of complex structures", IEEE Transaction of Pattern Analysis and Machine Intelligence, Vol. 24, No. 7, pp. 932-946, 2002

[Non-Patent Reference 2] L. Vacchetti, V. Lapetit, and P. Fua, "Combining edge and texture information for real-time accurate 3D camera tracking", Proceedings of International Symposium on Mixed and Augmented Reality, pp. 48-57, 2004

If an arbitrary measurement target object is used, measurement line segments may have a high density. In a measurement target object such as a jungle gym formed from a wireframe, the search areas of the respective measurement line segments projected onto a sensed image overlap each other. In this case, an edge search process in the overlapping search areas is useless.

The relationship between the measurement line segments is not taken into consideration. For this reason, near a corner of the measurement target object or for parallel measurement line segments in close vicinity on the sensed image, it may be impossible to correctly recognize the correspondence between a measurement line segment and an edge.

When a measurement target object is located far away, its size on a sensed image is small. Consequently, the interval between measurement line segments is small, and the search areas overlap with a high probability. The correspondence relationship between a detected edge and a measurement line segment is often erroneously recognized, affecting the position and orientation estimation result.

SUMMARY OF THE INVENTION

The present invention has been made in consideration of the above-described problems, and has as its object to provide a technique of accurately associating a measurement line segment of a measurement target object and an edge of the measurement target object on a sensed image and more accurately measuring the position and orientation of an image sensing device using the correspondence relationship.

According to the first aspect of the present invention, an information processing apparatus comprises:

an acquisition unit adapted to acquire a sensed image obtained by causing an image sensing device to sense a physical space including a physical object arranged in the physical space;

a projection unit adapted to project, onto the sensed image, a virtual object which simulates the physical object and is arranged at a position and orientation of the physical object;

a setting unit adapted to set a search range for each side of the virtual object projected onto the sensed image by the projection unit, near the side of the virtual object in the sensed image based on a positional relationship between the side and other sides of the virtual object;

a search unit adapted to search for a side of the physical object on the sensed image within the search range for each side of the virtual object; and a calculation unit adapted to calculate a position and orientation relationship between the physical object and the image sensing device using a correspondence relationship between each side of the virtual object projected onto the sensed image by the projection unit and each side of the physical object located on the sensed image, the correspondence relationship being determined based on a result of the search by the search unit.

According to the second aspect of the present invention, an information processing method comprises the steps of:

acquiring a sensed image obtained by causing an image sensing device to sense a physical space including a physical object arranged in the physical space;

projecting, onto the sensed image, a virtual object which simulates the physical object and is arranged at a position and orientation of the physical object;

setting a search range for each side of the virtual object projected onto the sensed image in the projection step, near the side of the virtual object in the sensed image based on a positional relationship between the side and other sides of the virtual object;

searching for a side of the physical object on the sensed image within the search range for each side of the virtual object; and calculating a position and orientation relationship between the physical object and the image sensing device using a correspondence relationship between each side of the virtual object projected onto the sensed image in the projecting step and each side of the physical object located on the sensed image, the correspondence relationship being determined based on a result of the search in the searching step.

Further features of the present invention will become apparent from the following description of exemplary embodiments with reference to the attached drawings.

BRIEF DESCRIPTION OF THE DRAWINGS

FIG. 9 is a block diagram showing the functional arrangement of a system according to the second embodiment of the present invention;

FIG. 10A is a view showing a sensed image;

FIG. 10B is a view showing projected measurement line segments obtained by projecting, onto the sensed image, the measurement line segments of a three-dimensional model that simulates a physical object;

FIG. 10C is a view showing a state in which the edges of the physical object on the sensed image shown in FIG. 10A are searched for in the vertical direction from each search starting point;

DESCRIPTION OF THE EMBODIMENTS

Preferred embodiments of the present invention will be described in detail hereinafter with reference to the accompanying drawings. Note that these embodiments will be described as examples of preferred arrangements of the invention described in the scope of claims, and such invention is not limited to the embodiments to be described hereinafter.

First Embodiment

Figure 1:
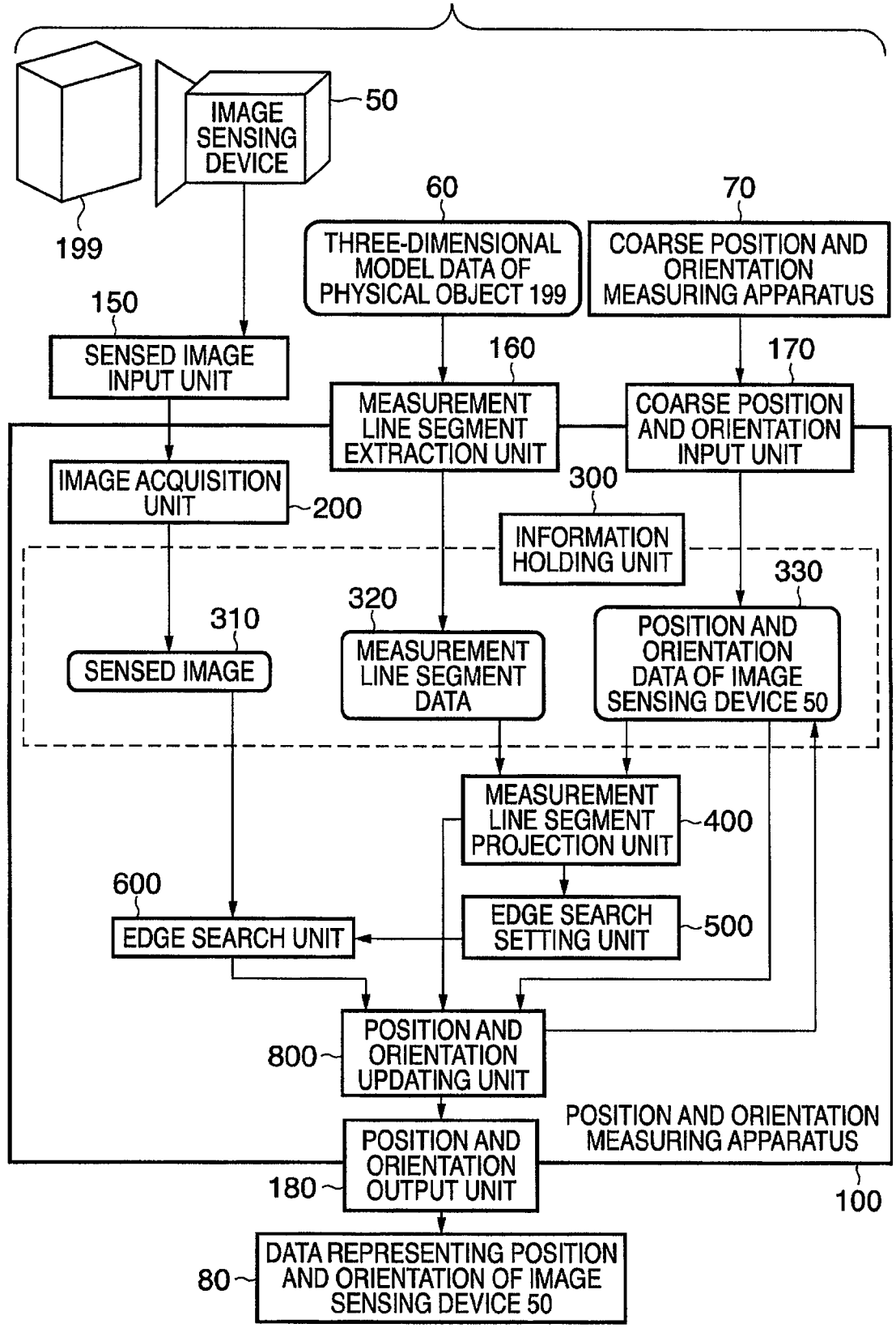
FIG. 1 is a block diagram showing the functional arrangement of a system including a position and orientation measuring apparatus 100 which measures the position and orientation of an image sensing device 50 and to which an information processing apparatus according to the first embodiment of the present invention is applied.

FIG. 1 is a block diagram showing the functional arrangement of a system including a position and orientation measuring apparatus 100 which measures the position and orientation of an image sensing device 50 and to which an information processing apparatus according to this embodiment is applied. As shown in FIG. 1, the system of this embodiment includes the image sensing device 50, position and orientation measuring apparatus 100, and coarse position and orientation measuring apparatus 70. These units will be described below with reference to FIG. 1.

A physical object 199 having an arbitrary shape formed from polygonal planes is arranged in a physical space as a measurement target object. In FIG. 1, the physical object 199 is a rectangular parallelepiped. However, the shape is not limited to this.

The image sensing device 50 senses a moving image of the physical space including the physical object 199 and sequentially inputs the sensed frame images (to be referred to as a sensed image or physical space image) to the position and orientation measuring apparatus 100. Note that the image sensing device 50 can be connected to the position and orientation measuring apparatus 100 via a cable or communicate with it wirelessly as long as a sensed image can be input to the position and orientation measuring apparatus 100. FIG. 1 illustrates the image sensing device 50 as a device separated from the position and orientation measuring apparatus 100. However, the image sensing device 50 may be integrated with the position and orientation measuring apparatus 100.

The coarse position and orientation measuring apparatus 70 acquires data representing the "position and orientation of the image sensing device 50", which is to be used by the position and orientation measuring apparatus 100 as an initial value in executing a process to be described later, and supplies the acquired data representing the "position and orientation of the image sensing device 50" to the position and orientation measuring apparatus 100. Various apparatuses are applicable as the coarse position and orientation measuring apparatus 70.

An example in which a magnetic sensor system is applied to the coarse position and orientation measuring apparatus 70 will be described. The magnetic sensor system includes a transmitter, receiver, and controller. The coarse position and orientation measuring apparatus 70 using the magnetic sensor system acquires the data representing the "position and orientation of the image sensing device 50" in the following way.

First, the receiver is attached near the image sensing viewpoint of the image sensing device 50. The transmitter is arranged at a predetermined position in the physical space. The transmitter generates a magnetic field in its vicinity under the control of the controller. The receiver detects a change in the magnetic field corresponding to its position and orientation in the magnetic field. The receiver sends a signal representing the detection result to the controller. The controller obtains the position and orientation of the receiver in a sensor coordinate system based on the signal. The sensor coordinate system has the position of the transmitter as the origin, and three axes intersecting at right angles at the origin as the x-, y-, and z-axes. When such a magnetic sensor system is applied to the coarse position and orientation measuring apparatus 70, the coarse position and orientation measuring apparatus 70 acquires the position and orientation of the receiver in the sensor coordinate system by executing the same process as that of the magnetic sensor system described above. When the sensor coordinate system matches the world coordinate system, the data obtained by the magnetic sensor system represents the position and orientation of the receiver in the world coordinate system. If the sensor coordinate system does not match the world coordinate system, and the position and orientation relationship between them is known, the position and orientation in the world coordinate system can be obtained by transforming the data obtained in the sensor coordinate system in accordance with the position and orientation relationship. Note that in the above explanation, the position and orientation of the receiver are handled as those of the image sensing device 50. The position and orientation relationship between the receiver and the lens position (viewpoint) of the image sensing device 50 is measured as a bias in advance. The coarse position and orientation measuring apparatus 70 can obtain the position and orientation of the viewpoint by adding the bias to the position and orientation of the receiver. The coarse position and orientation measuring apparatus 70 sends the acquired position and orientation data to the position and orientation measuring apparatus 100.

A user may measure the position and orientation of the image sensing device 50 in advance and register it in the memory of a computer such that the coarse position and orientation measuring apparatus 70 can read out the data from the memory and input it to the position and orientation measuring apparatus 100. As described above, various arrangements are usable to cause the coarse position and orientation measuring apparatus 70 to acquire data representing the position and orientation of the image sensing device 50 and input it to the position and orientation measuring apparatus 100. Note that the coarse position and orientation measuring apparatus 70 inputs the position and orientation data of the image sensing device 50 to the position and orientation measuring apparatus 100 only once. The position and orientation measuring apparatus 100 then executes a process (to be described later) using the data as an initial value, thereby obtaining more accurate position and orientation of the image sensing device 50. Since the obtained more accurate position and orientation are used as the initial value for the next arithmetic process, the coarse position and orientation measuring apparatus 70 is unnecessary from then on.

Data 60 of the three-dimensional model (virtual object) of the physical object 199 will be described next. The three-dimensional model data 60 is formed from an information group which describes the three-dimensional geometric shape of the physical object 199. The three-dimensional model data 60 will be described later in detail. The three-dimensional model data 60 can be created using, for example, a commercially available three-dimensional CAD or software for CG creation, and the creation method is not particularly limited. The three-dimensional model data 60 is saved in, for example, a server apparatus or hard disk device externally connected to the position and orientation measuring apparatus 100, read out, and input to the position and orientation measuring apparatus 100 as needed. When the three-dimensional model data 60 is registered in the memory (not shown) of the position and orientation measuring apparatus 100 in advance, it is read out from the memory at the time of use.

The position and orientation measuring apparatus 100 will be described next. This embodiment has a purpose of causing the position and orientation measuring apparatus 100 to obtain the relative position and orientation of the image sensing device 50 sensing the image of the physical object 199 with respect to the physical object 199. A "process of obtaining the "position and orientation of the image sensing device 50" to be described below is executed by the position and orientation measuring apparatus 100 every time the image sensing device 50 inputs the sensed image of one frame to the position and orientation measuring apparatus 100. That is, the position and orientation measuring apparatus 100 executes the "process of obtaining the position and orientation of the image sensing device 50" for each sensed image input from the image sensing device 50.

The position and orientation measuring apparatus 100 includes a processing unit for executing various processes, and a holding unit for holding information. The latter corresponds to an information holding unit 300 in FIG. 1. The former corresponds to the units except the information holding unit 300.

A sensed image input unit 150 includes a connector for connecting the image sensing device 50 to the position and orientation measuring apparatus 100. A sensed image output from the image sensing device 50 is input to an image acquisition unit 200 of the succeeding stage via the sensed image input unit 150.

The image acquisition unit 200 executes sampling by referring to the horizontal and vertical sync signals of the video signal of the sensed image input via the sensed image input unit 150. On the basis of the sampled video signal, the image acquisition unit 200 generates two-dimensional image data. The two-dimensional image data is sent to the information holding unit 300 as the data of the sensed image.

The information holding unit 300 holds the sensed image data received from the image acquisition unit 200 as a sensed image 310.

On the other hand, a measurement line segment extraction unit 160 receives the above-described three-dimensional model data 60. The measurement line segment extraction unit 160 extracts measurement line segment data 320 from the three-dimensional model data 60 and sends the extracted data to the information holding unit 300. The information holding unit 300 holds the measurement line segment data 320.

The measurement line segment data 320 is formed from the data of the three-dimensional coordinate values of the vertices of the two ends of each line segment of the three-dimensional model (represented by three-dimensional model data 60). For example, if the three-dimensional model is formed from a polygon, the measurement line segment data 320 is formed from the data of the three-dimensional coordinate values of its vertices. The process of causing the measurement line segment extraction unit 160 to read out the measurement line segment data 320 from the three-dimensional model data 60 and registering the extracted data in the information holding unit 300 may be performed before the start of a calculation process of activating the position and orientation measuring apparatus 100 and obtaining the position and orientation of the image sensing device 50 (to be described later). If the measurement line segment data 320 used in the preceding position and orientation calculation process is stored in a nonvolatile memory, the measurement line segment data 320 may directly be used.

When the three-dimensional model data 60 has the format of design CAD data, the measurement line segment extraction unit 160 analyzes the format, obtains the measurement line segment data 320, and registers it in the information holding unit 300. That is, the measurement line segment extraction unit 160 analyzes the format of the three-dimensional model data 60 independently of its type, obtains the measurement line segment data 320, and registers it in the information holding unit 300.

A coarse position and orientation input unit 170 receives data representing the position and orientation of the image sensing device 50 sent from the coarse position and orientation measuring apparatus 70. As described above, the data received from the coarse position and orientation measuring apparatus 70 is used as an initial value by the position and orientation measuring apparatus 100 and therefore need not always be accurate. If the data sent from the coarse position and orientation measuring apparatus 70 represents the position and orientation in the world coordinate system, the data is directly registered in the information holding unit 300 of the succeeding stage as data 330 representing the position and orientation of the image sensing device 50. On the other hand, if the data sent from the coarse position and orientation measuring apparatus 70 represents the position and orientation in a coordinate system such as a sensor coordinate system other than the world coordinate system, the data is converted into data representing the position and orientation in the world coordinate system using the position and orientation relationship between the coordinate system and the world coordinate system. Then, the converted data is registered in the information holding unit 300 as the data 330. Anyway, "data representing the position and orientation of the image sensing device 50 in the world coordinate system" is registered in the information holding unit 300 as the data 330.

A process of obtaining the position and orientation of the image sensing device 50 with respect to the physical object 199 using these pieces of information registered in the information holding unit 300 will be described next. As described above, the process is executed every time the sensed image 310 is registered in the information holding unit 300.

The position and orientation of the physical object 199 in the world coordinate system and the positions of the two ends of each side (measurement line segment) of each plane (polygon) of the physical object 199 are measured in advance by a certain suitable method. Data representing the measurement result is registered in the memory (not shown) of the position and orientation measuring apparatus 100. As described above, the coordinate positions of the two ends of each side (measurement line segment) of each plane (polygon) of the three-dimensional model that simulates the physical object 199 are registered in the measurement line segment data 320. Hence, a measurement line segment projection unit 400 executes a process of arranging the three-dimensional model that simulates the physical object 199 at the position and orientation of the physical object 199 in the world coordinate system by converting each coordinate position into a position in the world coordinate system. In this projection, an invisible side that is occluded by a near-side plane is not projected. This technique is known, and a description thereof will be omitted.

The relationship between a position $[x_w, y_w, z_w]^T$ in the world coordinate system and a coordinate position $[u_x, u_y]^T$ obtained by projecting the position onto a sensed image is represented, based on a perspective projection transformation matrix P, by $$\begin{pmatrix} hu_x \\ hu_y \\ h \end{pmatrix} = P \begin{pmatrix} x_w \\ y_w \\ z_w \\ 1 \end{pmatrix} \quad (1)$$

where h of the left-hand side uses an expression of homogeneous coordinate transformation. When h is obtained as a term of a constant multiple, a value is obtained by dividing each term by h. Let a matrix R (3×3 matrix) having $R_{11}$, $R_{12}$, $R_{13}$, $R_{21}$, $R_{22}$, $R_{23}$, $R_{31}$, $R_{32}$, and $R_{33}$ as elements be the rotation matrix of the orientation, and $t=[t_x, t_y, t_z]$ be the translation matrix. Then, P is given by $$P = \begin{pmatrix} -f_x & 0 & p_x & 0 \\ 0 & -f_y & p_y & 0 \\ 0 & 0 & 1 & 0 \end{pmatrix} \begin{pmatrix} R & t \\ 0 \ 0 \ 0 & 1 \end{pmatrix} \quad (2)$$

$$= \begin{pmatrix} -f_x & 0 & p_x & 0 \\ 0 & -f_y & p_y & 0 \\ 0 & 0 & 1 & 0 \end{pmatrix} \begin{pmatrix} R_{11} & R_{12} & R_{13} & t_x \\ R_{21} & R_{22} & R_{23} & t_y \\ R_{31} & R_{32} & R_{33} & t_z \\ 0 & 0 & 0 & 1 \end{pmatrix}$$

where $f_x$ and $f_y$ are the horizontal focal length and the vertical focal length, respectively, and $p_x$ and $p_y$ are the horizontal principal point coordinate and the vertical principal point coordinate on the sensed image.

The data 330 held by the information holding unit 300 contains data of the position $t=[t_x, t_y, t_z]^T$, and data of an orientation $\omega=[\omega_x, \omega_y, \omega_z]^T$. The data of the orientation $\omega$ and the rotation matrix R have a relationship given by $$R = \quad (3)$$

$$\begin{pmatrix} \cos\omega_z & -\sin\omega_z & 0 \\ \sin\omega_z & \cos\omega_z & 0 \\ 0 & 0 & 1 \end{pmatrix} \begin{pmatrix} \cos\omega_y & 0 & \sin\omega_y \\ 0 & 1 & 0 \\ -\sin\omega_y & 0 & \cos\omega_y \end{pmatrix} \begin{pmatrix} 1 & 0 & 0 \\ 0 & \cos\omega_x & -\sin\omega_x \\ 0 & \sin\omega_x & \cos\omega_x \end{pmatrix}$$

The measurement line segment projection unit 400 projects the two ends of each measurement line segment of the three-dimensional model arranged in the world coordinate system onto the image sensing plane of the image sensing device 50 using the above expressions. This allows obtaining the coordinate positions of the two ends of each measurement line segment on the image sensing plane. An image sensed by the image sensing device 50 is formed on the image sensing plane. The image includes the sensed image of the physical object 199. More specifically, the image includes the physical object 199 and the three-dimensional model that simulates the physical object 199, which overlap each other with a slight shift. However, the corresponding sides are shifted between the physical object 199 and the three-dimensional model. In the following process, the side of the three-dimensional model which corresponds to each side of the physical object 199 is searched for.

When the measurement line segment projection unit 400 projects the two ends of all measurement line segments of the three-dimensional model onto the image sensing plane, an edge search setting unit 500 determines the positional relationship between the projected measurement line segments by referring to the coordinate positions of the two ends of each projected measurement line segment. To execute an edge search process (to be described later) near a projected measurement line segment, the edge search setting unit 500 sets a search range.

As the main process, the edge search setting unit 500 determines a portion where the search range of a measurement line segment overlaps that of another measurement line segment and sets a new search area. The edge search setting unit 500 also detects, in the peripheral area of a measurement line segment projected onto the image sensing plane, an area having a local density change on the sensed image obtained by the image sensing device 50. An area having a local density change will be referred to as an edge. In non-patent reference 1, an edge is searched for in the vertical one-dimensional direction of a projected measurement line segment. This makes it possible to efficiently detect an edge position by a smaller number of operations than in checking all pixels for an edge in the peripheral area.

The process of the edge search setting unit 500 will be described in detail.

Figure 2:
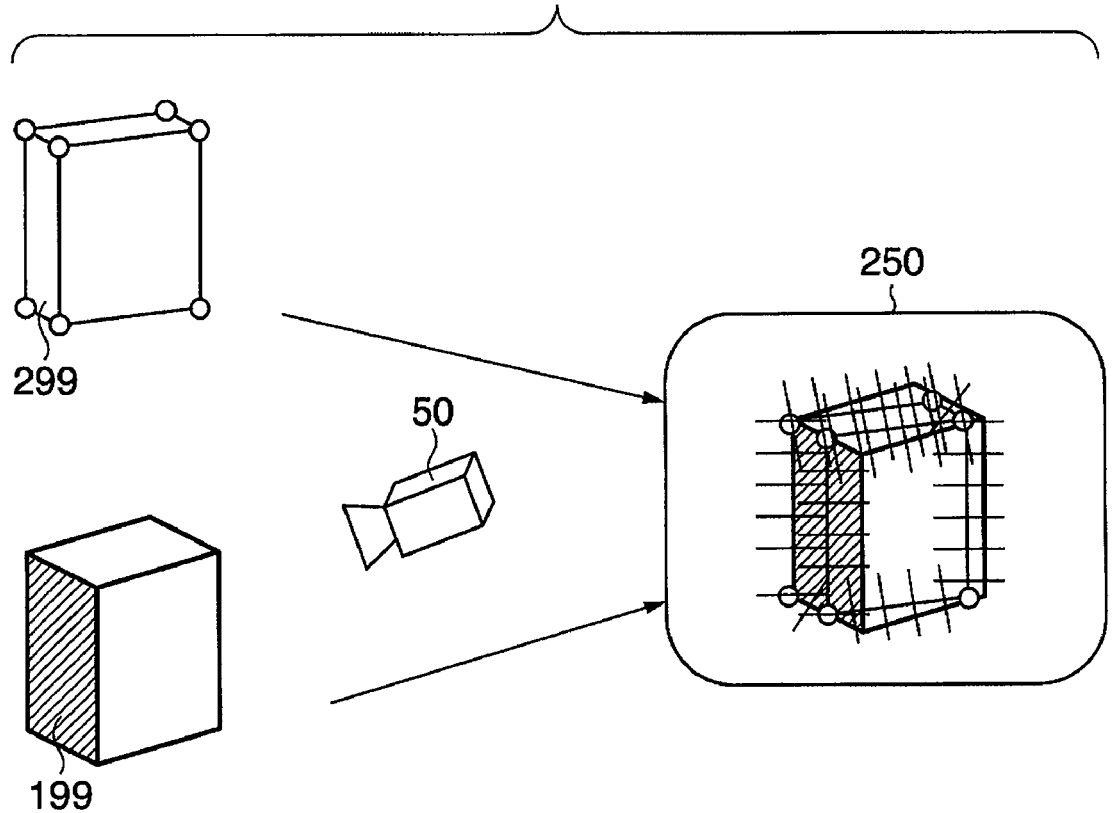
FIG. 2 is a view for explaining a process of searching for each side (edge) of a physical object 199, which corresponds to a side (measurement line segment) of a three-dimensional model.

FIG. 2 is a view for explaining a process of searching for each side (edge) of the physical object 199, which corresponds to a side (measurement line segment) of the three-dimensional model. Referring to FIG. 2, reference numeral 299 denotes a three-dimensional model represented by the three-dimensional model data 60; and 250, a sensed image obtained by the image sensing device 50. The sensed image 250 includes the physical object 199 sensed by the image sensing device 50. Since the measurement line segment projection unit 400 arranges the virtual object 299 at the position and orientation of the physical object 199 and then projects it onto the sensed image 250, as described above, the virtual object 299 is located on the sensed image 250. An edge having a local density change is searched for near each side of the virtual object 299. The range where an edge on the sensed image is searched for will be called an edge search area. A measurement line segment that is projected will be called a projected measurement line segment.

Figure 3:
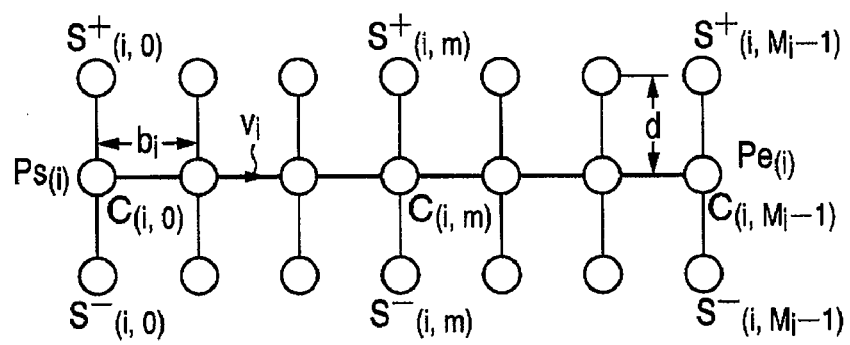
FIG. 3 is a view for explaining a process of searching for an edge near an i-th projected measurement line segment (side of interest)

FIG. 3 is a view for explaining a process of searching for an edge near an i-th projected measurement line segment (side of interest). In this case, i is an index added to a projected measurement line segment of a three-dimensional model on a sensed image. The i-th projected measurement line segment will be called a "projected measurement line segment i" hereinafter.

The coordinate position of the starting point of the projected measurement line segment i on the sensed image is represented by $Ps(i)=[xs_i, ys_i]^T$, and the end point is represented by $Pe(i)[xe_i, ye_i]^T$.

A vector $v_i$ which connects the starting point and the end point is given by $v_i=[xe_i-xs_i, ye_i-ys_i]^T$. A normalized vector $\bar{v}_i$ is given by $$\bar{v}_i = \frac{v_i}{|v_i|} \quad (4)$$

Next, search starting points $c_{(i,m)}$ are set on the vector $v_i$ at an equal interval $(=b_i)$. In this case, $0 \leq m \leq M_i$, and $M_i$ is given by $$M_i = \left[\frac{|v_i|}{B}\right] \quad (5)$$

where [x] is a maximum integer smaller than x, and B is a predetermined search line segment interval. In accordance with the above expression, the interval $b_i$ is obtained by $$b_i = \frac{|v_i|}{M_i} \quad (6)$$

From the above expression, the search starting point $c_{(i,m)}$ is obtained by $$c_{(i,m)} = Ps(i) + mb_i \bar{v}_i \quad (7)$$

An edge is searched for, from the search starting point $c_{(i,m)}$, within a predetermined distance range in a direction perpendicular to the vector $v_i$. As shown in FIG. 3, an edge is searched for within the range from $s^+_{(i,m)}$ to $s^-_{(i,m)}$ on both sides of the search starting point $c_{(i,m)}$.

A vector perpendicular to the normalized vector $\bar{v}_i$ is expressed by $\bar{v}_{i\perp}$. That is, $\bar{v}_i \cdot \bar{v}_{i\perp} = 0$ ("·" represents an inner product).

The relationship between $c_{(i,m)}$ and $s^+_{(i,m)}$ and that between $c_{(i,m)}$ and $s^-_{(i,m)}$ are given by $$S^+_{(i,m)} = c_{(i,m)} + d\bar{v}_{\perp} \quad (8)$$

$$S^-_{(i,m)} = c_{(i,m)} - d\bar{v}_{\perp} \quad (9)$$

where d can appropriately be determined.

Hence, an edge for the projected measurement line segment i can be searched for by executing edge search for every m within the range of $s^+_{(i,m)}$ to $s^-_{(i,m)}$. However, if the same process is executed for another projected measurement line segment, the edge search areas may overlap, resulting in process redundancy.

Figure 4A:
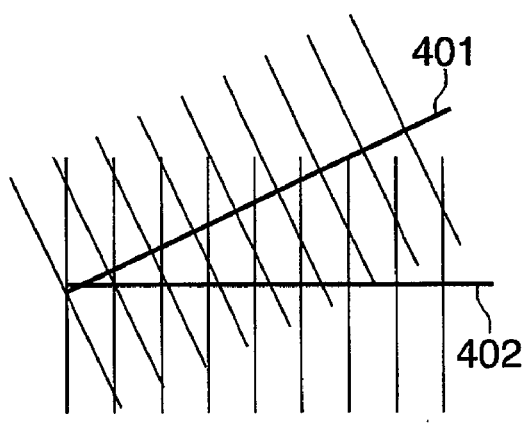
FIGS. 4A and 4B are views for explaining process redundancy that occurs in searching for an edge for each projected measurement line segment.
Figure 4B:
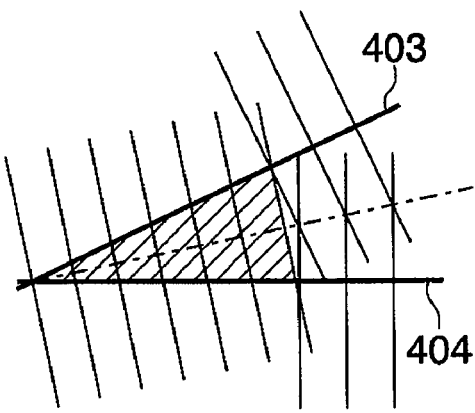

FIGS. 4A and 4B are views for explaining process redundancy that occurs in searching for an edge for each projected measurement line segment.

As shown in FIG. 4A, the above-described edge search process is executed for projected measurement line segments 401 and 402. The edge search areas (line segments perpendicular to the projected measurement line segments 401 and 402) have redundant portions. In FIG. 4A, the area sandwiched between the projected measurement line segments 401 and 402 is redundant. This embodiment has a purpose of minimizing such a redundant area by performing search only once in a hatched portion as shown in FIG. 4B.

Figure 5:
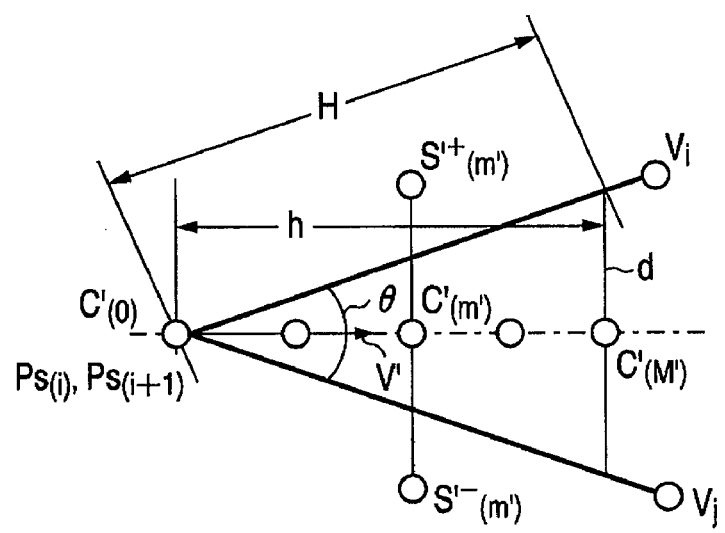
FIG. 5 is a view for explaining a process of setting edge search areas for two projected measurement line segments that share one end.

FIG. 5 is a view for explaining a process of setting edge search areas for two (a plurality of) projected measurement line segments that share one end. In FIG. 5, the vectors $v_i$ and $v_j$ share the starting point.

Letting θ be the angle made by the vectors $v_i$ and $v_j$, we have $$\cos\theta = \frac{v_i \cdot v_j}{|v_i||v_j|} = \overline{v}_i \cdot \overline{v}_j \qquad (10)$$

A median vector $v'^-$ is obtained based on $$\overline{v}' = \overline{v}_i + \overline{v}_j \qquad (11)$$

Search is executed only once in an area (hatched area in FIG. 4B) where the length of a perpendicular dropped from each of the vectors $v_i$ and $v_j$ to the median vector $v'^-$ is d or less.

When the length of a perpendicular dropped from each of the vector $v_i$ ($v_j$) to the median vector is d or less, let h be the distance from the intersection of the perpendicular and the median vector to the starting point of the median vector (the starting point matches with the starting points of the vectors $v_i$ and $v_j$). Then, the following expression holds.

$$\frac{d}{h} = \tan\frac{\theta}{2}$$

(12)

Expression (12) yields $$h = d\left(\sqrt{\frac{1-\cos\theta}{1+\cos\theta}}\right)^{-1} \qquad (13)$$

Search starting points $c'_{(m')}$ are set on the median vector at equal intervals. In this case, $0 \leq m' \leq M'$, and M' is given by $$M' = \left[\frac{h}{B}\right] \qquad (14)$$

using B.

An edge is searched for within a predetermined distance range in a direction perpendicular to the vector $v'^-$ from the search starting point. As shown in FIG. 5, an edge is searched for within the range from $s'^+_{(m')}$ to $s'^-_{(m')}$ on both sides of the search starting point $c_{(m')}$.

A vector perpendicular to the median vector $v'^-$ is expressed by $v'^-_\perp$. In this case, the relationship between $c'_{(m')}$ and $s'^+_{(m')}$ and that between $c'_{(m')}$ and $s'^-_{(m')}$ are given by $$s'^+_{(m')} = c'_{(m')} + d\overline{v}'_\perp$$

$$s'^-_{(m')} = c'_{(m')} - d\overline{v}'_\perp \qquad (15)$$

In searching for an edge for the vectors $v_i$ and $v_j$, the edge search process is not performed within the range of H ($=\sqrt{(h^2+d^2)}$) from the starting point of each vector. H is given by $$H = \sqrt{h^2 + d^2} = d^2 \frac{2}{1-\cos\theta} \qquad (16)$$

An edge is searched for at each search starting point $c'_{(m')}$ on the median vector. More specifically, for the hatched portion in FIG. 4B, an edge is searched for at each search starting point $c'_{(m')}$ on the median vector. Outside that portion, an edge is searched for at each search starting point on each of the vectors $v_i$ and $v_j$. Hence, when two vectors share a starting point, the edge search process is executed only once for each search starting point on a median vector in an area where the two vectors are very close to each other. This eliminates the redundancy and prevents the edge search process from being executed for each vector.

When three or more vectors share a starting point, the same process is performed regarding the vectors at two ends as the two vectors.

In the above-described way, the edge search setting unit 500 sets, in accordance with the positional relationship of the projected measurement line segments, an area where an edge is to be searched for near a projected measurement line segment and an area where an edge is to be searched for near a median vector. Then, an edge search unit 600 executes edge search in the set areas.

Even when projected measurement line segments are almost parallel, the edge search setting unit 500 executes the process of eliminating an area where process redundancy occurs. For example, "two line segments are almost parallel" indicates that the difference (the "difference" can be defined in various ways and is not particularly limited) between the components of the direction vectors of the line segments becomes equal to or smaller than a predetermined threshold value.

Figure 6A:
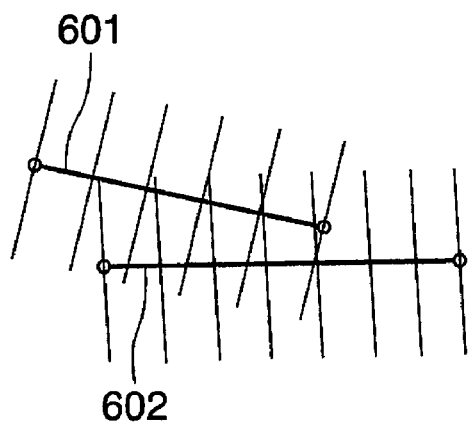
FIGS. 6A and 6B are views for explaining process redundancy that occurs in searching for an edge for each projected measurement line segment.
Figure 6B:
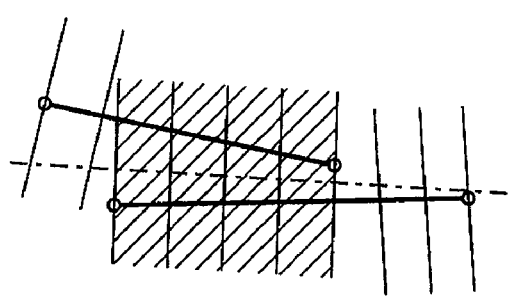

FIGS. 6A and 6B are views for explaining process redundancy that occurs in searching for an edge for each projected measurement line segment.

As shown in FIG. 6A, the above-described edge search process is executed for projected measurement line segments 601 and 602. The edge search areas (line segments perpendicular to the projected measurement line segments 601 and 602) have redundant portions. In FIG. 6A, the area sandwiched between the projected measurement line segments 601 and 602 is redundant. A three-dimensional model including a number of repetitive patterns such as window frames of a building has a number of projected measurement line segments parallel to each other. This embodiment has a purpose of minimizing such a redundant area by performing search only once in a hatched portion as shown in FIG. 6B.

Figure 7:
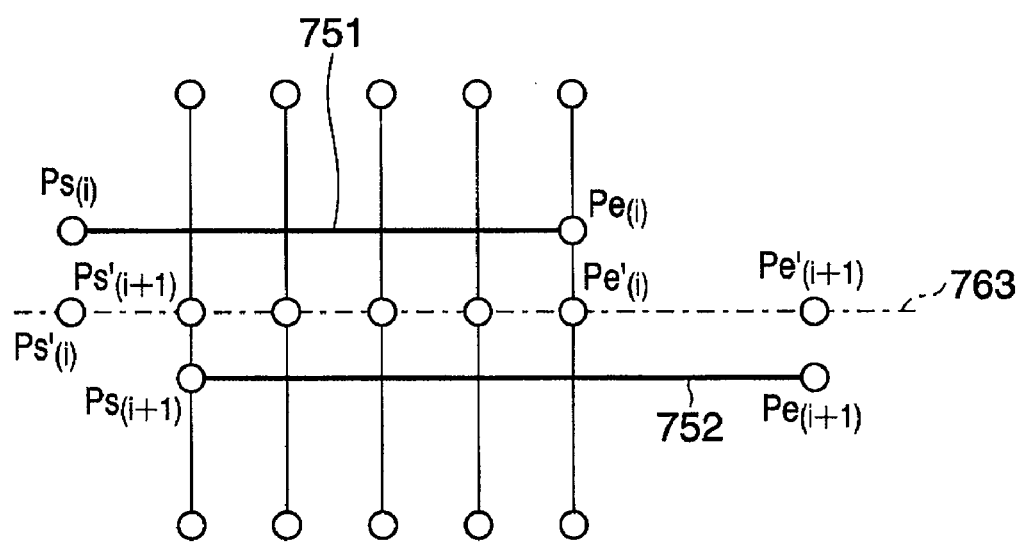
FIG. 7 is a view for explaining a process of setting search areas for two projected measurement line segments that are almost parallel to each other.

FIG. 7 is a view for explaining a process of setting search areas for two projected measurement line segments that are almost parallel to each other. When measurement line segments that can be projected measurement line segments almost parallel to each other are selected in advance by a certain suitable method, and the following process is executed for only the selected measurement line segments, the process efficiency can further be increased.

In this embodiment, of the measurement line segments as the display target of the measurement line segment data 320, only those which are selected in advance as almost parallel measurement line segments undergo the following process. The almost parallel projected measurement line segments may be detected by image processing, as a matter of course. However, the process is cumbersome.

Referring to FIG. 7, measurement line segments 751 and 752 are determined as parallel based on the three-dimensional coordinates of the ends. The starting point and end point of the measurement line segment 751 on the sensed image are represented by $Ps(i)=[xs_i, ys_i]^T$ and $Pe(i)=[xe_i, ye_i]^T$, respectively. The starting point and end point of the measurement line segment 752 on the sensed image are represented by $Ps(i+1)=$ $[xs_{i+1} ys_{i+1}]^T$ and $Pe(i+1)=[xe_{i+1} ye_{i+1}]^T$, respectively. The starting and end points are obtained by projecting points in the three-dimensional space onto the sensed image by the above-described process.

A vector which connects Ps(i) and Pe(i) is defined as $v_i$, and a vector which connects Ps(i+1) and Pe(i+1) is defined as $v_j$.

A line that passes through the median of a line segment that connects the starting points of the two projected measurement line segments and that of a line segment that connects the end points is defined as a median 763.

A median Ps⁻ between the starting points Ps(i) and Ps(i+1) is given by $$\overline{Ps} = \left[\frac{xs_i + xs_j}{2} \frac{ys_i + ys_j}{2}\right]^T \quad (17)$$

A median Pe⁻ between the end points Pe(i) and Pe(i+1) is given by $$\overline{Pe} = \left[\frac{xe_i + xe_j}{2} \frac{ye_i + ye_j}{2}\right]^T \quad (18)$$

A vector v' which connects the medians Ps and Pe and its normalized vector v'⁻ are given by $$v' = \overline{Pe} - \overline{Ps} \quad (19)$$
$$\overline{v}' = \frac{v'}{|v'|}$$

The intersections of the median 763 and the perpendiculars dropped from the starting points Ps(i) and Ps(i+1) and the end points Pe(i) and Pe(i+1) are represented by Ps'(i), Ps'(i+1), Pe'(i), Pe'(i+1), respectively. An overlapping section between the section from Ps'(i) to Pe'(i) and the section from Ps'(i+1) to Pe'(i+1) is obtained. In FIG. 7, the section from Ps'(i+1) to Pe'(i) is the overlapping section. For this section, search starting points are set, and the edge search process is executed for each search starting point, as in an area sandwiched between vectors sharing a starting point.

In the above-described way, the edge search setting unit 500 sets, in accordance with the positional relationship of the projected measurement line segments, an area where an edge is to be searched for near a projected measurement line segment and an area where an edge is to be searched for near a median. Then, the edge search unit 600 executes edge search in the set areas.

The above-described method of setting an edge search area basically need only integrate overlapping areas and may be changed in accordance with the calculation capability of the apparatus or the number of target measurement line segments. The total number n of search areas need only be (n−1) or less.

The edge search unit 600 reads the density of each pixel of the sensed image 310 from each search starting point set in the above-described manner in a direction perpendicular to the projected measurement line segment. The read range is preferably set in consideration of the positional relationship between the physical object 199 and the image sensing device 50. A pixel whose read density has a large gradient with respect to an adjacent pixel is determined as a "pixel included in an edge", and the coordinate position of the pixel is recorded. This process is executed for each search starting point.

Figure 8:
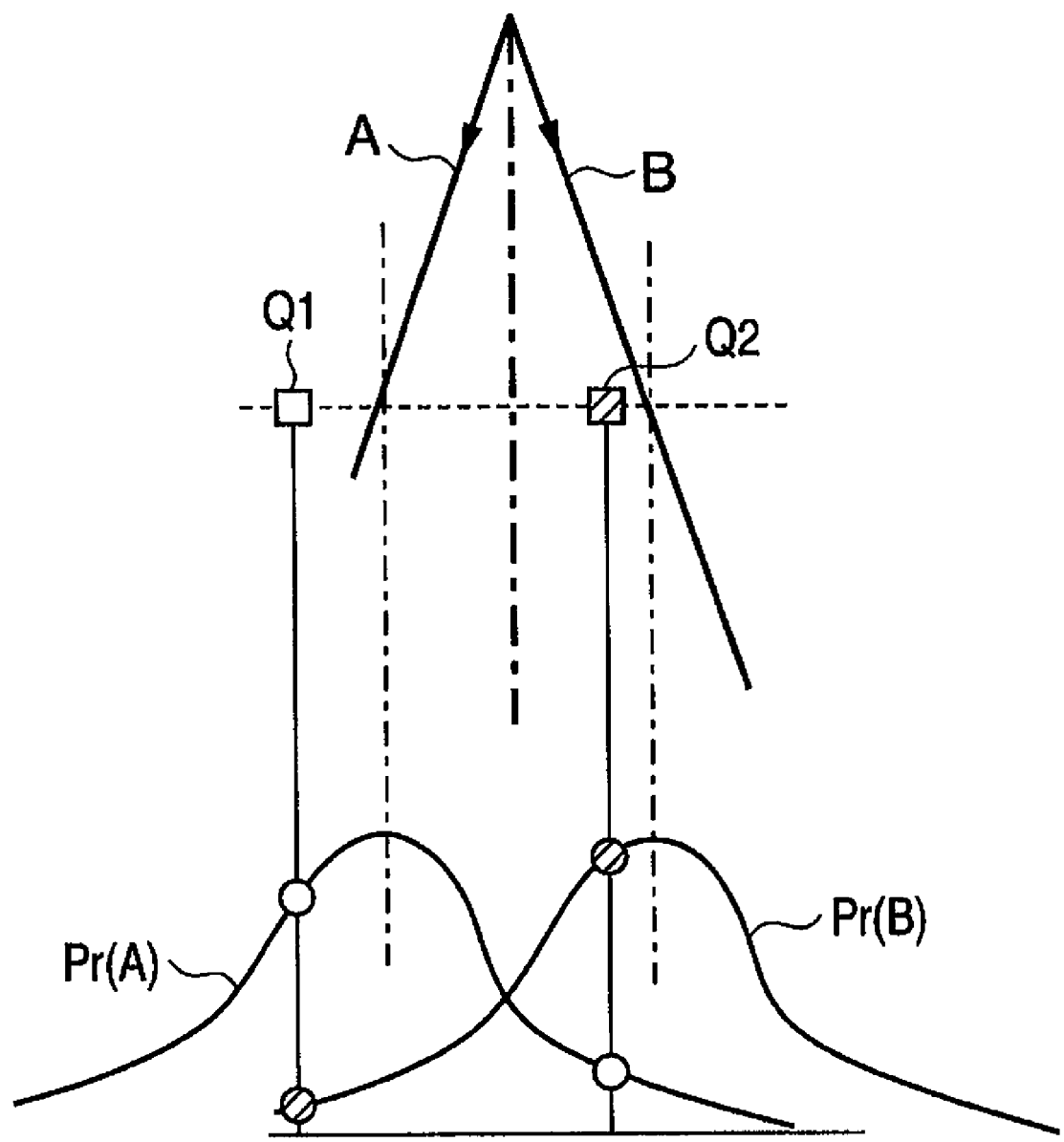
FIG. 8 is a view showing the positional relationship between projected measurement line segments and pixels of found edges.

FIG. 8 is a view showing the positional relationship between projected measurement line segments and pixels of found edges. Referring to FIG. 8, a pixel Q1 is searched from a projected measurement line segment A, and a pixel Q2 is searched from a projected measurement line segment B. A probability density distribution Pr(A) is set while defining, as its center, the search starting point on the projected measurement line segment A from which the pixel Q1 is found. A probability density distribution Pr(B) is set while defining, as its center, the search starting point on the projected measurement line segment B from which the pixel Q2 is found. The probability densities of the pixel Q1 on the probability density distributions Pr(A) and Pr(B) are obtained. A projected measurement line segment corresponding to a distribution with a higher probability density is determined as a projected measurement line segment corresponding to the pixel Q1. Similarly, the probability densities of the pixel Q2 on the probability density distributions Pr(A) and Pr(B) are obtained. A projected measurement line segment corresponding to a distribution with a higher probability density is determined as a projected measurement line segment corresponding to the pixel Q2.

As described above, the pixel group of an edge corresponding to one projected measurement line segment can be specified. Consequently, it is possible to detect an edge (correspondence relationship) corresponding to each projected measurement line segment.

A position and orientation updating unit 800 obtains the position and orientation of the image sensing device 50 based on the image coordinates of the two ends of each edge detected by the edge search unit 600, and the distance to a projected measurement line segment corresponding to each edge.

The process executed by the position and orientation updating unit 800 will be described here in detail. The position and orientation updating unit 800 re-estimates the position and orientation of the image sensing device 50 by minimizing the error between the position of the target object on the sensed image and the position of the target object on the sensed image estimated based on the currently obtained position and orientation of the image sensing device 50.

In this embodiment, an error function E representing the "error" is used. E is a function using the following parameters as inputs.

The position $t=[t_x,t_y,t_z]^T$ of the image sensing device 50

The orientation $\omega=[\omega_x,\omega_y,\omega_z]^T$ of the image sensing device 50

The positions $x_w=[x_w y_w z_w]^T$ of the two ends of each side (measurement line segment) of each plane (polygon) of the physical object 199

Letting $u'=[u'_x,u'_y]^T$ be the image coordinates of the two ends of a projected measurement line segment, and $u=[u_x,u_y]^T$ be the image coordinates of the edge corresponding to the two ends of the projected measurement line segment, we have $$E(t_x,t_y,t_z,\omega_x,\omega_y,\omega_z,x_w,y_w,z_w)=u'-u \quad (20)$$

Generally, the error function E is a nonlinear function. In this embodiment, letting u″ be the intersection of the projected measurement line segment and a line that intersects the projected measurement line segment at right angles and passes through $u=[u_x,u_y]^T$, $$E'(t_x,t_y,t_z,\omega_x,\omega_y,\omega_z,x_w,y_w,z_w)=u''-u \quad (21)$$

is used as the error function E.

When Expression (21) is linearly approximated using linear Taylor expansion in a range where the position and orientation of the image sensing device 50 slightly change, we have $$E'(t_x, t_y, t_z, \varpi_x, \varpi_y, \varpi_z, x_w, y_w, z_w) \cong \qquad (22)$$

$$E'_0 + \frac{\partial E'}{\partial t_x}\Delta t_x + \frac{\partial E'}{\partial t_y}\Delta t_y + \frac{\partial E'}{\partial t_z}\Delta t_z + \frac{\partial E'}{\partial \varpi_x}\Delta \varpi_x +$$

$$\frac{\partial E'}{\partial \varpi_y}\Delta \varpi_y + \frac{\partial E'}{\partial \varpi_z}\Delta \varpi_z + \frac{\partial E'}{\partial x_w}\Delta x_w + \frac{\partial E'}{\partial y_w}\Delta y_w + \frac{\partial E'}{\partial z_w}\Delta z_w$$

where $E'_0$ is an error obtained by substituting $t^0$, $\omega^0$, $x_w^0$, and $u^0$ into the error function E. In this case, $t^0$, $\omega^0$, $x_w^0$, and $u^0$ are given by $$t^0 = [t_x^0 t_y^0 t_z^0]^T$$

$$\omega^0 = [\omega_x^0 \omega_y^0 \omega_z^0]^T$$

$$x_w^0 = [x_w^0 y_w^0 z_w^0]^T$$

$$u^0 = [u_x^0 u_y^0]^T$$

Using expressions linearized near $t^0$, $\omega^0$, $x_w^0$, and $u_0$, $\Delta t_x$, $\Delta t_y$, $\Delta t_z$, $\Delta \omega_x$, $\Delta \omega_y$, $\Delta \omega_z$, $\Delta x_w$, $\Delta y_w$, and $\Delta z_w$ can be obtained. The obtained values are added to $t^0$, $\omega^0$, $x_w^0$, and $u^0$ as correction values, thereby minimizing the error function E.

Normally, the number of equations does not match the number of variables. For this reason, a correction vector $\Delta$ is obtained by a least squares method using the information concerning a number of reference points. The correction vector $\Delta$ will be described. Let J be a matrix of partial derivatives of the variables. Then, from the above expressions, the correction vector $\Delta$ and an error vector E' have a relationship given by $$J\Delta = E' \qquad (23)$$

Next, the left- and right-hand sides are multiplied by a transpose $J^T$ of the matrix J to form the expression of the correction vector $\Delta$ which is given by $$\Delta = (J^T J)^{-1} J^T E' \qquad (24)$$

The above-described calculation process is repeatedly executed until the value of each component of the correction vector $\Delta$ becomes equal to or smaller than a threshold value, thereby obtaining a more accurate position and orientation of the image sensing device 50. The position and orientation updating unit 800 outputs, as data 80, data representing the position and orientation of the image sensing device 50 obtained when a predetermined condition that, for example, the value of each component of the correction vector $\Delta$ is equal to or smaller than a threshold value is satisfied. The output destination is not particularly limited.

The above-described method is based on an equation solving method by the Newton's method. However, the error function E may be minimized by another method. The same effect as described above can be obtained using a known nonlinear optimization method because it is only necessary to reduce the difference on the sensed image between an observed line segment and a line segment of a three-dimensional model projected based on estimated position and orientation.

For example, in correspondence with a roughly estimated position and orientation, a number of random combinations having a small difference near each variable are generated. An error is obtained for each combination, and a combination with a minimum error is used. Even this method can produce the same effect as described above.

Figure 11:
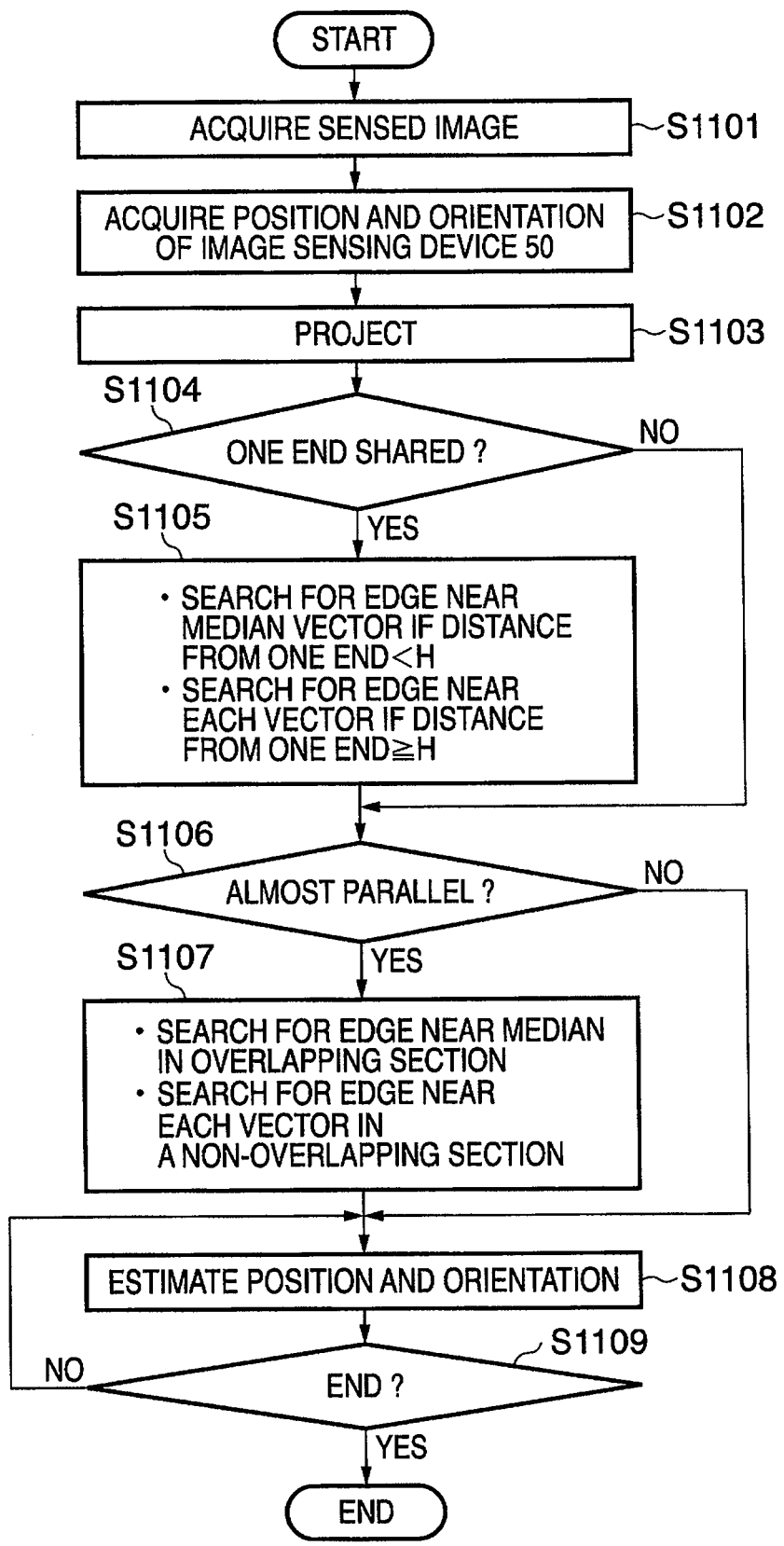
FIG. 11 is a flowchart illustrating a process of causing a position and orientation measuring apparatus 100 to obtain the position and orientation of an image sensing device 50.

FIG. 11 is a flowchart illustrating a process of causing the position and orientation measuring apparatus 100 to obtain the position and orientation of the image sensing device 50. A process according to the flowchart in FIG. 11 is the same as described above and will be described here briefly.

In step S1101, the sensed image input unit 150 inputs a sensed image sent from the image sensing device 50 to the image acquisition unit 200 as a signal. The image acquisition unit 200 executes sampling by referring to the horizontal and vertical sync signals of the video signal of the sensed image. Based on the sampled video signal, the image acquisition unit 200 generates two-dimensional image data and sends it to the information holding unit 300. The information holding unit 300 holds the sensed image data received from the image acquisition unit 200 as the sensed image 310.

In step S1102, the coarse position and orientation input unit 170 receives data sent from the coarse position and orientation measuring apparatus 70 and representing the position and orientation of the image sensing device 50. The data is registered in the information holding unit 300 of the succeeding stage as the data 330 representing the position and orientation of the image sensing device 50. If the data sent from the coarse position and orientation measuring apparatus 70 represents the position and orientation in a coordinate system such as a sensor coordinate system other than the world coordinate system, the data is converted into data representing the position and orientation in the world coordinate system using the position and orientation relationship between the coordinate system and the world coordinate system. The converted data is registered in the information holding unit 300 as the data 330.

In step S1103, the measurement line segment extraction unit 160 extracts the measurement line segment data 320 from the three-dimensional model data 60 and sends the extracted data to the information holding unit 300. The information holding unit 300 holds the measurement line segment data 320. The measurement line segment projection unit 400 projects the two ends of each measurement line segment of the three-dimensional model arranged in the world coordinate system onto the image sensing plane of the image sensing device 50.

In step S1104, the edge search setting unit 500 determines the positional relationship between the projected measurement line segments by referring to the coordinate positions of the two ends of each measurement line segment. The edge search setting unit 500 also checks whether two or more projected measurement line segments share one end. If no such projected measurement line segments exist, the process advances to step S1106. If two or more such projected measurement line segments exist, the process advances to step S1105.

In step S1105, the edge search setting unit 500 sets, in accordance with the positional relationship of the projected measurement line segments, an area where an edge is to be searched for near a projected measurement line segment and an area where an edge is to be searched for near a median vector. The edge search unit 600 executes the edge search process at each search starting point $c'_{(m)}$ on the median vector if the distance from one end of each of the vectors sharing one end is smaller than H. In a range where the distance is H or more, the edge search process is executed at each search starting point on the respective vectors.

In step S1106, the edge search setting unit 500 determines the positional relationship between the measurement line segments by referring to the coordinate positions of the two ends of each measurement line segment. The edge search setting unit 500 also checks whether almost parallel projected measurement line segments exist. If no such projected measurement line segments exist, the process advances to step S1108. If such projected measurement line segments exist, the process advances to step S1107.

In step S1107, the edge search setting unit 500 sets, in accordance with the positional relationship of the projected measurement line segments, an area where an edge is to be searched for near a projected measurement line segment and an area where an edge is to be searched for near a median. Then, the edge search setting unit 500 obtains an overlapping section between the section of one projected measurement line segment and that of the other projected measurement line segment. For the obtained section, the edge search setting unit 500 sets search starting points, as in an area sandwiched between vectors sharing a starting point. The edge search unit 600 executes the edge search process for each search starting point. For a non-overlapping section between the projected measurement line segments, the edge search process is executed at each search starting point on the respective projected measurement line segments, as described above.

When an edge corresponding to each measurement line segment is detected, the position and orientation updating unit 800 executes the above arithmetic process in step S1108 to estimate the position and orientation of the image sensing device 50. When an end condition that, for example, the value of each component of the correction vector Δ is equal to or smaller than a threshold value is satisfied in the arithmetic process, the process is ended after step S1109. If the end condition is not satisfied, the process returns from step S1109 to step S1108 to repeat the arithmetic process.

As described above, according to this embodiment, it is possible to reduce overlap of edge search areas on the sensed image. Reducing overlap of edge search areas is equivalent to reducing the number of accesses to the memory that holds the image. Since this shortens the time required for the whole process, the process efficiency is expected to rise.

Second Embodiment

In the second embodiment, a case in which the position and orientation measuring apparatus 100 described in the first embodiment is applied to a system for presenting a mixed reality to a user will be described.

FIG. 9 is a block diagram showing the functional arrangement of a system according to this embodiment. The same reference numerals as in FIG. 1 denote the same parts in FIG. 9.

Referring to FIG. 9, a physical object 10 is a solid object formed from polygonal planes. An image sensing device 50 senses a moving image of a physical space including the physical object 10 and inputs the frame images to a chromakey composition device 920 via an image input unit 921 and also to a position and orientation measuring apparatus 100 via a sensed image input unit 150.

In the position and orientation measuring apparatus 100, three-dimensional model data corresponding to the physical object 10 is registered in place of the three-dimensional model data 60. The data structure is the same as described above.

The position and orientation measuring apparatus 100 executes the same process as described in the first embodiment to obtain the position and orientation of the image sensing device 50 with respect to the physical object 10 and inputs data representing the obtained position and orientation to a CG (Computer Graphics) rendering device 910 via a position and orientation input unit 911.

Upon receiving the data representing the position and orientation from the position and orientation measuring apparatus 100, the CG rendering device 910 sets a viewpoint having the position and orientation represented by the data in a virtual space and generates an image (CG) of the virtual space viewed from the viewpoint. Reference numeral 950 in FIG. 9 denotes an image generated by the CG rendering device 910. The image data is input to the chromakey composition device 920 via an image input unit 922.

In this embodiment, the overall background image generated by the CG rendering device 910 has a chromakey color.

The chromakey composition device 920 generates an image (composite image) by chromakey-compositing the CG received from the CG rendering device 910 with the sensed image received from the image sensing device 50. Reference numeral 930 in FIG. 9 denotes a composite image. The composite image can be displayed on, for example, a display device formed from a CRT or a liquid crystal screen or the display device of a known HMD (Head Mount Display).

The use of this system allows observation of, for example, interference between parts using an actual part and a virtual part under design by CAD. For example, when the operator observes the composite image 930 using an HMD, he/she can easily confirm it.

When the direction of the line of sight of the user who wears the HMD on the head is aligned with the image sensing direction of the image sensing device 50, a composite image corresponding to the position and orientation of the user's head can be presented to the user.

It is also possible to implement the position and orientation measuring apparatus 100, CG rendering device 910, and chromakey composition device 920 in a single apparatus.

FIGS. 10A to 10C are views showing the relationship between a physical object and measurement line segments. FIG. 10A is a view showing a sensed image. FIG. 10B is a view showing projected measurement line segments obtained by projecting, onto the sensed image, the measurement line segments of a three-dimensional model that simulates the physical object. Open circles in FIG. 10B indicate search starting points on the projected measurement line segments. FIG. 10C shows a state in which the edges of the physical object on the sensed image shown in FIG. 10A are searched for in the vertical direction from each search starting point. A short line segment extending from each search starting point indicated by an open circle represents the distance to an observed edge of the physical object on the sensed image. The shorter the distance from a projected measurement line segment to an edge is, the higher the estimation accuracy of the position and orientation of the image sensing device 50 is.

The arrangement described in the above embodiment is merely an example. Any other apparatus having the image sensing device 50 and the position and orientation measuring apparatus 100, for example, a camera-equipped portable phone or a camera-equipped notebook computer is also applicable to the system described in the first embodiment. It is also possible to provide a secondary service for presenting information about neighboring facilities or locations using a position and orientation measurement result.

Third Embodiment

In the first embodiment, all the units included in the position and orientation measuring apparatus 100 shown in FIG. 1 are formed from hardware. However, some of the units may be formed from software. For example, an information holding unit 300 may be implemented as a memory. Input units 150 and 170, an extraction unit 160, and an output unit 180 may be implemented by I/Fs (interfaces). The remaining units may be implemented by software.

In this case, the software is stored in a memory provided in a general PC (Personal Computer) and executed by the CPU of the PC. When some of the units of the position and orientation measuring apparatus 100 show in FIG. 1 are implemented by software in this way, the computer for executing the software is applicable to the position and orientation measuring apparatus 100.

Figure 12:
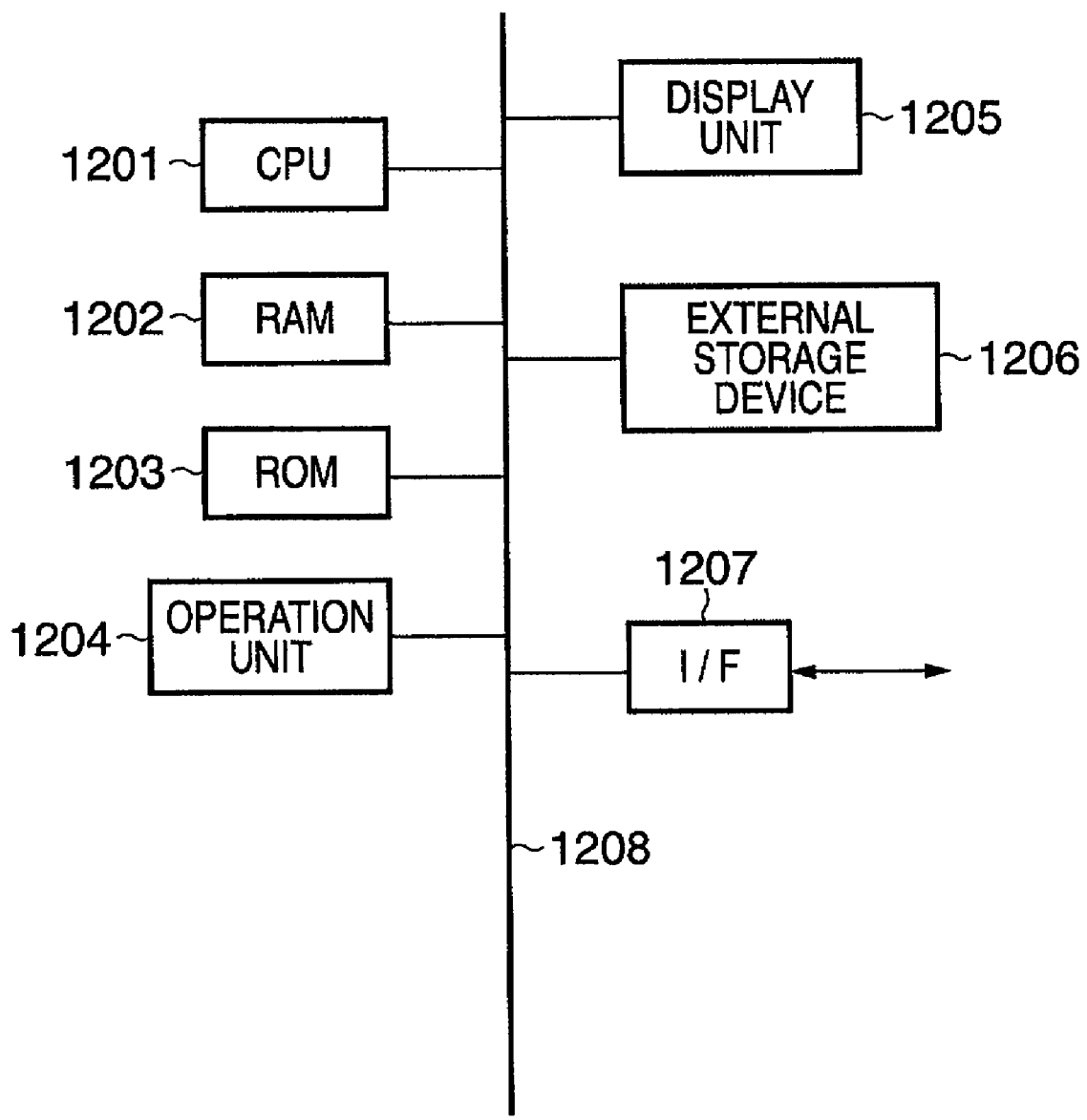
FIG. 12 is a block diagram showing the hardware configuration of a computer applicable to the position and orientation measuring apparatus 100.

FIG. 12 is a block diagram showing the hardware configuration of a computer applicable to the position and orientation measuring apparatus 100.

A CPU 1201 controls the entire computer using computer programs and data stored in a RAM 1202 or a ROM 1203 and also executes the above-described processes to be performed by the position and orientation measuring apparatus 100 to which the computer is applied.

The RAM 1202 has an area for temporarily storing computer programs and data loaded from an external storage device 1206 or data externally received via an I/F 1207. The RAM 1202 also has a work area to be used by the CPU 1201 for process execution. For example, the RAM 1202 corresponds to the information holding unit 300 shown in FIG. 1. The CPU 1201 executes a process using the computer programs and data held in the RAM 1202.

The ROM 1203 stores boot programs and setting data of the computer.

An operation unit 1204 includes a keyboard and a mouse. The operator of the computer can input various kinds of instructions to the CPU 1201 by operating the operation unit 1204.

A display unit 1205 includes a CRT or a liquid crystal screen and can display a process result by the CPU 1201 as an image or a text. For example, the display unit 1205 can display a sensed image or a composite image.

The external storage device 1206 is a mass storage device represented by a hard disk drive. The external storage device 1206 stores an OS (Operating System), and computer programs and data which cause the CPU 1201 to execute the above-described processes to be executed by the position and orientation measuring apparatus 100. The computer programs correspond to those which cause the CPU 1201 to execute the above-described functions of, for example, the image acquisition unit 200, measurement line segment projection unit 400, edge search setting unit 500, edge search unit 600, and position and orientation updating unit 800. The known information described above is also stored in the external storage device 1206. The computer programs and data stored in the external storage device 1206 are loaded in the RAM 1202 as needed under the control of the CPU 1201 and processed by the CPU 1201.

The I/F 1207 is connected to the image sensing device 50 or coarse position and orientation measuring apparatus 70. The I/F 1207 may be provided for each of the apparatuses.

A bus 1208 connects the above-described units.

Those skilled in the art can easily modify the hardware configuration of the computer as needed.

Other Embodiments

The object of the present invention is also achieved by the following method. A recording medium (or storage medium) which records software program codes to implement the functions of the above-described embodiments is supplied to a system or apparatus. The storage medium is a computer-readable storage medium, as a matter of course. The computer (or CPU or MPU) of the system or apparatus reads out and executes the program codes stored in the recording medium. In this case, the program codes read out from the recording medium themselves implement the functions of the above-described embodiments. The recording medium that records the program codes constitutes the present invention.

Alternatively, the computer executes the readout program codes, and the operating system (OS) running on the computer partially or wholly executes actual processing based on the instructions of the program codes, thereby implementing the functions of the above-described embodiments.

The program codes read out from the recording medium are written in the memory of a function expansion card inserted into the computer or a function expansion unit connected to the computer. The CPU of the function expansion card or function expansion unit partially or wholly executes actual processing based on the instructions of the program codes, thereby implementing the functions of the above-described embodiments.

The recording medium to which the present invention is applied stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-115988, filed Apr. 25, 2007, which is hereby incorporated by reference herein in its entirety.

What is claimed is:

1. An information processing apparatus comprising:
    an acquisition unit adapted to acquire a sensed image obtained by causing an image sensing device to sense a physical space including a physical object arranged in the physical space;
    a projection unit adapted to project, onto the sensed image, a virtual object which simulates the physical object and is arranged at a position and orientation of the physical object;
    a setting unit adapted to set a search range for each side of the virtual object projected onto the sensed image by said projection unit, near the side of the virtual object in the sensed image based on a positional relationship between the side and other sides of the virtual object;
    a search unit adapted to search for a side of the physical object on the sensed image within the search range for each side of the virtual object; and
    a calculation unit adapted to calculate a position and orientation relationship between the physical object and the image sensing device using a correspondence relationship between each side of the virtual object projected onto the sensed image by said projection unit and each side of the physical object located on the sensed image, the correspondence relationship being determined based on a result of the search by said search unit;
    wherein said setting unit comprises:
        a derivation unit adapted to derive a line segment between a plurality of sides of the virtual object;
        a first setting unit adapted to set a range near the line segment as a first search range constituting the search range; and a second setting unit adapted to set a range near the plurality of sides of the virtual object and outside of the first search range, as a second search range constituting the search range.

2. The apparatus according to claim 1, wherein when there are a plurality of sides share one end, of the sides of the virtual object projected onto the sensed image by said projection unit, said setting unit sets the search area so that the search is performed only once in an area between the plurality of sides.

3. The apparatus according to claim 1, wherein when there are two sides that are parallel to each other and a medium of the two sides have an overlapping projected area, of the sides of the virtual object projected onto the sensed image by said projection unit, said setting unit sets the search area so that the search is performed only once in an area between the two sides and the median.

4. The apparatus according to claim 1, further comprising:
   a unit adapted to generate an image of a virtual space viewed from a viewpoint determined based on the position and orientation relationship obtained by said calculation unit; and
   a unit adapted to output a composite image obtained by compositing the image of the virtual space with the sensed image.

5. An information processing method comprising the steps of:
   acquiring a sensed image obtained by causing an image sensing device to sense a physical space including a physical object arranged in the physical space;
   projecting, onto the sensed image, a virtual object which simulates the physical object and is arranged at a position and orientation of the physical object;
   setting a search range for each side of the virtual object projected onto the sensed image by said projection unit, near the side of the virtual object in the sensed image based on a positional relationship between the side and other sides of the virtual object;
   searching for a side of the physical object on the sensed image within the search range for each side of the virtual object; and
   calculating a position and orientation relationship between the physical object and the image sensing device using a correspondence relationship between each side of the virtual object projected onto the sensed image by said projection unit and each side of the physical object located on the sensed image, the correspondence relationship being determined based on a result of the search by said search unit;
   wherein said setting step comprises:
      deriving a line segment between a plurality of sides of the virtual object;
      setting a range near the line segment as a first search range constituting the search range; and
      setting a range near the plurality of sides of the virtual object and outside of the first search range, as a second search range constituting the search range.

6. A computer-readable storage medium for storing a computer program which causes a computer to execute an information processing method of claim 5.

* * * * *